United States Patent [19]

Mossi

[11] Patent Number: 5,445,408
[45] Date of Patent: Aug. 29, 1995

[54] SPLIT RING INFLATOR ADAPTER

[75] Inventor: G. Dean Mossi, Roy, Utah

[73] Assignee: Morton International, Inc., Chicago, Ill.

[21] Appl. No.: 284,348

[22] Filed: Aug. 2, 1994

[51] Int. Cl.6 ................................................ B60R 21/16
[52] U.S. Cl. ................................ 280/728.2; 280/732; 280/741
[58] Field of Search ..................... 280/728 A, 732, 741

[56] References Cited

U.S. PATENT DOCUMENTS

| | | | |
|---|---|---|---|
| 3,787,010 | 1/1974 | Meranshian et al. | 244/146 |
| 4,153,273 | 5/1979 | Risko | 280/728 A |
| 4,913,461 | 4/1990 | Cuevas | 280/731 |
| 4,915,410 | 4/1990 | Bachelder | 280/732 |
| 4,988,119 | 1/1991 | Hartmeyer | 280/743 R |
| 5,069,480 | 12/1991 | Good | 280/743 R |
| 5,096,222 | 3/1992 | Komerska et al. | 280/732 |
| 5,141,247 | 8/1992 | Barth | 280/728 A |
| 5,152,549 | 10/1992 | Aird | 280/728 A |
| 5,197,756 | 3/1993 | Jarboe et al. | 280/728 A |
| 5,342,084 | 8/1994 | Rose et al. | 280/728 A |
| 5,356,175 | 10/1994 | Rose et al. | 280/728 A |

FOREIGN PATENT DOCUMENTS

| | | | |
|---|---|---|---|
| 815530 | 8/1951 | Germany. | |
| 1-160756 | 6/1989 | Japan | B60R 21/20 |
| 1-160757 | 6/1989 | Japan | B60R 21/20 |

*Primary Examiner*—Kenneth R. Rice
*Attorney, Agent, or Firm*—George W. Rauchfuss, Jr.; Gerald K. White

[57] ABSTRACT

An adapter permits a cylindrical airbag inflator to be housed in a longer inflator housing, even if the diameter of the inflator varies from optimal. The adapter is in the form of a split tube. One end of the adapter forms a socket receiving the base of the inflator. The other end forms a base which is received in a circular opening in the inflator housing end wall.

12 Claims, 1 Drawing Sheet

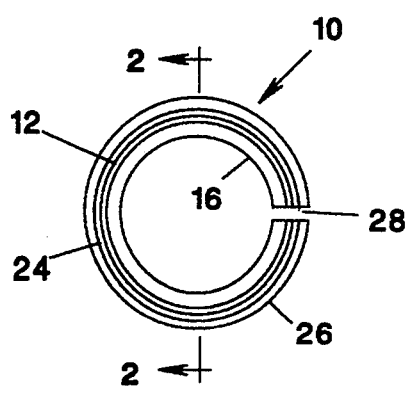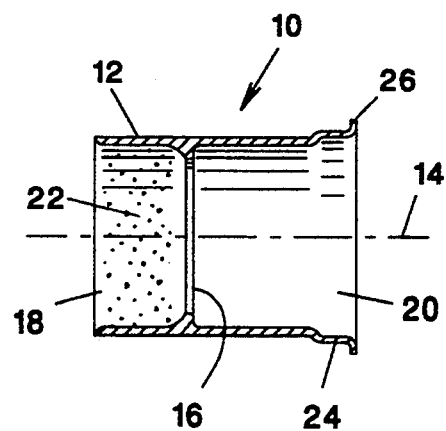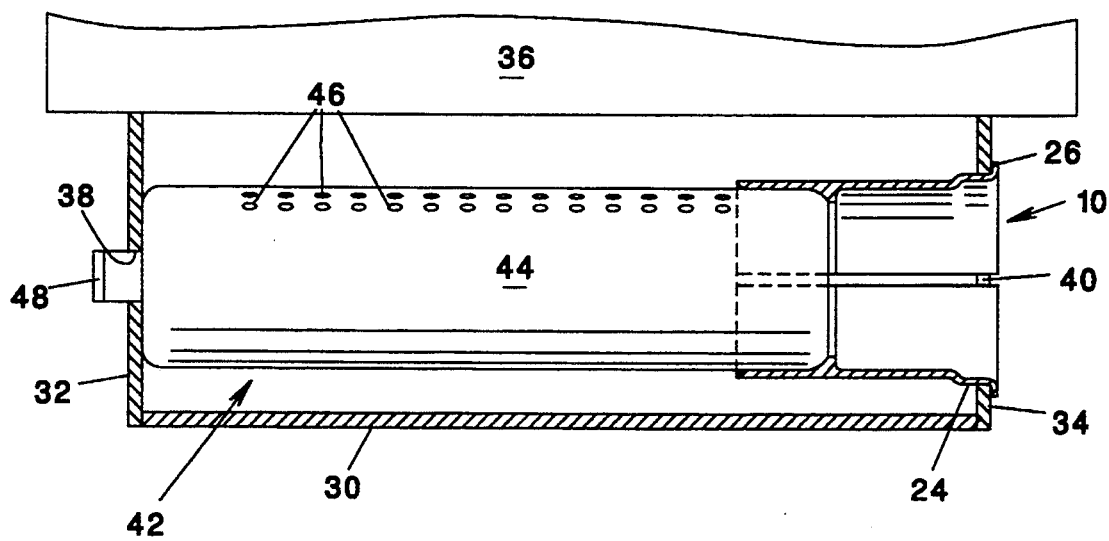

SPLIT RING INFLATOR ADAPTER

TECHNICAL FIELD

This invention relates to automotive airbag modules. More particularly, it relates to the mounting of a cylindrical inflator within an inflator housing.

BACKGROUND ART

A conventional passenger-side airbag module includes a trough-shaped reaction canister which houses a folded airbag. An inflator housing forms a part of, or is closely associated with, the reaction canister. An inflator is mounted within the inflator housing which produces gases that enter the open mouth of the airbag and inflate it. One commonly employed type of inflator is in the form of a cylinder containing an ignition charge which is activated by a crash sensor. Upon activation, the charge rapidly causes generation of gases which pass through openings in the sidewall of the inflation cylinder to fill the airbag.

Normally, the cylindrical inflator is mounted within the inflator housing between its two endwalls. One end of the inflator may carry a mounting stud or key which extends through a keyway in one end wall to properly orient the inflator. The other end of the inflator, which is normally circular, is retained in a circular opening in an opposite end wall.

The prior art construction described above requires the dimensions of the cylindrical inflator to match those of the inflator housing. This presents two problems. First, unless tolerances are kept closely in check, the round end of the inflator may not match the size of the opening in the inflator housing end wall. Secondly, it may often be desirable or necessary to install an inflator that is smaller or shorter than the internal dimensions of the inflator housing would normally require.

Accordingly, it is a primary object of the present invention to provide an adapter which is readily adjustable to permit installation of an undersized inflator into an inflator housing. Another object is to provide such an adapter which will form an integral union with the inflator prior to installation into the housing. Other objects, features, and advantages will become apparent from the following description and appended claims.

SUMMARY OF THE INVENTION

The invention comprises a tubular, substantially cylindrical, adapter made from an elastic material. The sidewall of the adapter includes a longitudinal slit which runs from end to end of the sidewall to permit elastic deformation of the tube. One end of the adapter includes a socket for receiving and gripping the cylindrical end of an inflator. The other end of the adapter forms a base designed to seat within the circular opening of the inflator housing end wall and includes a flange which seats against the outer surface of the end wall.

BRIEF DESCRIPTION OF THE DRAWINGS

FIG. 1 is an end view of an adapter in accordance with the present invention;

FIG. 2 is a cross-section taken substantially along the line 2—2 of FIG. 1; and

FIG. 3 is a longitudinal cross-section of an inflator housing enclosing a cylindrical inflator mounted therein by means of the adapter of the invention.

BEST MODE FOR CARRYING OUT THE INVENTION

With particular reference to FIGS. 1 and 2, there is illustrated a tubular, substantially cylindrical, adapter 10 in accordance with the present invention. It is formed from an elastic material, generally from one of a variety of metals, such as, for example, aluminum. It comprises a cylindrical sidewall 12 having a longitudinal axis 14. An internal circumferential rib 16 extends radially inward and divides the adapter into a socket end 18 and a base end 20. The inner surface of the sidewall 12 on socket end 18 may include a roughened surface 22 which may be provided by any suitable means including, for example, knurling or grooving. The internal diameter of the socket end 18 is slightly smaller than the outside diameter of an inflator on which the adapter is to be mounted.

The base end 20, depending on the proposed application, may include one or more outwardly belled portions 24 surrounded by and terminating in a circumferential radially extending flange 26 which may be continuous or discontinuous. The outwardly belled portion 24 of base end 20 has a greater outside diameter than that of the socket end 18. Finally, the adapter includes a slit 28 which extends longitudinally the full length of sidewall 12, that is, from end to end. The slit 28 may, but need not necessarily, be parallel to the longitudinal axis 14. The split 28 permits expansion of the outside diameter of the adapter 10 to permit it to fit over the outside diameter of an inflator and the elasticity of the adapter allows the adapter to tightly grip the inflator with a friction fit. The roughened surface 22 of the adapter 10 further enhances the friction fit of the adapter on the inflator.

The manner in which the adapter of this invention functions is illustrated in FIG. 3 wherein an inflator housing is illustrated comprising a generally cylindrical sidewall 30 closed by plates forming end walls 32, 34. The inflator housing is shown appended to a reaction canister 36. The canister 36 is not illustrated in detail because its construction is well known to those skilled in the art. The end wall 32 defines a keyway 38 which may, but need not, be symmetrical to align an inflator to be supported therein. The opposite end wall 34 defines a circular opening 40 which normally receives the round end of a cylindrical inflator. In the FIG. 3 illustration, however, an inflator 42 is employed which is substantially shorter than the length of the inflator housing.

The inflator 42 comprises a cylindrical body 44 having the usual gas discharge openings 46 in its sidewall and a key 48 extending from one end. In order to install the inflator 42 into the substantially longer inflator housing, the adapter 10 of this invention is employed.

Preferably, the adapter 10 is attached to the inflator 42 prior to its insertion into the inflator housing so that the adapter does not have to be installed at a final assembly stage of an airbag module assembly. This is accomplished by sliding the socket end 18 of the adapter 10 over the cylindrical base of the inflator 42, causing the end of the inflator to seat against the internal rib 16. A fairly wide range of inflator diameters may be accommodated by the adapter of the invention. This is due to the slit 28 which permits the adapter 10 to be elastically deformed to engage an inflator having an oversize diameter. This creates a frictional interface between the roughened surface 22 of the socket end 18 and the cylindrical body 44 of inflator 42 which causes the adapter to tightly grip the inflator body. This is particularly effective when both the body 44 of the inflator 42 and the adapter 10 are made of aluminum because of the galling action that takes place when one aluminum member is brought into frictional contact with another. It is also possible to spin weld or inertia weld the adapter onto the aluminum inflator by techniques well-known to those skilled in the art. In any event, the adapter 10 and the inflator 42 become a single assembly. This is important from the manufacturing point of view because the inflator and adapter may thereafter be installed as a single unit into the inflator housing. This is done by inserting the unit through the circular opening 40 and advancing the key 48 on the inflator through the keyway 38 in the end wall 32. At the same time, the belled portion 24 of the adaptor fits snugly into the circular opening 40 of end wall 34. The opening is encircled by the flange 26 which abuts against the outer surface of the end wall 34 of the inflator housing.

It is important to note that the internal radial rib 16 serves at least two purposes. First, it acts as a stop to limit the depth to which the inflator 42 may be inserted into the adapter 10. Second, it acts to radially strengthen the adapter 10 in order to provide a stronger grip on the inflator 42 after insertion.

The "split ring" concept allows a fairly wide range of inflator diameters to be accommodated by expansion of the adapter. This wide range of diameters might be the normal tolerance variation resulting from the manufacture of a particular inflator. A second advantage of the split ring adapter is that the elasticity inherent in the material causes it to grip the inflator with a friction fit. As the adapter 10 expands to accommodate the inflator, it is elastically deformed so as to tightly grip the inflator body when released.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In a motor vehicle airbag module assembly including a reaction canister, an inflator housing adjoining said reaction canister having a first end defining a keyway and a second end having an outer and an inner surface defining a substantially circular mounting opening, and a substantially cylindrical inflator within said housing having a first end carrying a key supported in said keyway and a substantially circular second end, the improvement comprising:

a tubular, substantially cylindrical, adapter having (a) a base end seated within said mounting opening and a flange extending radially outwardly from said base end against said outer surface;
   (b) a socket end surrounding and gripping the second end of said inflator;
   (c) an inwardly extending circumferential rib positioned to bear against the second end of said inflator; and
   (d) a slot extending longitudinally through said adapter to allow radial expansion thereof.

2. The improvement of claim 1 wherein said slot is substantially parallel to a longitudinal axis of said adapter.

3. The improvement of claim 1 wherein a portion of the socket end gripping the inflator is roughened to enhance the gripping effect.

4. The improvement of claim 1 wherein the base end of said adapter has a greater outside diameter than that of the socket end.

5. The improvement of claim 2 wherein a portion of the socket end gripping the inflator is roughened to enhance the gripping effect.

6. The improvement of claim 5 wherein the base end of said adapter has a greater outside diameter than that of the socket end.

7. An adapter for retaining an end of a substantially cylindrical automotive airbag inflator within an opening in an inflator housing having a larger diameter than an external diameter of the inflator which comprises:

a tubular sidewall, substantially cylindrical about a longitudinal axis, having a base end and a socket end;

said base end being positionable within said circular opening and including a flange extending radially outwardly therefrom and adapted to seat against the housing surrounding said opening;

said socket end being adapted to surround and grip an end of said inflator;

a circumferential rib extending radially inward from said sidewall and positioned to bear against said inflator end; and a slot extending longitudinally through said sidewall to allow radial expansion of said adapter.

8. The adapter of claim 7 wherein said slot is substantially parallel to said longitudinal axis.

9. The adapter of claim 7 wherein a portion of the socket end adapted to surround the inflator end is roughened to enhance the gripping effect.

10. The adapter of claim 7 wherein the base end has a greater outside diameter than that of the socket end.

11. The adapter of claim 8 wherein a portion of the socket end adapted to surround the inflator end is roughened to enhance the gripping effect.

12. The adapter of claim 11 wherein the base end has a greater outside diameter than that of the socket end.

* * * * *